Figure 1:
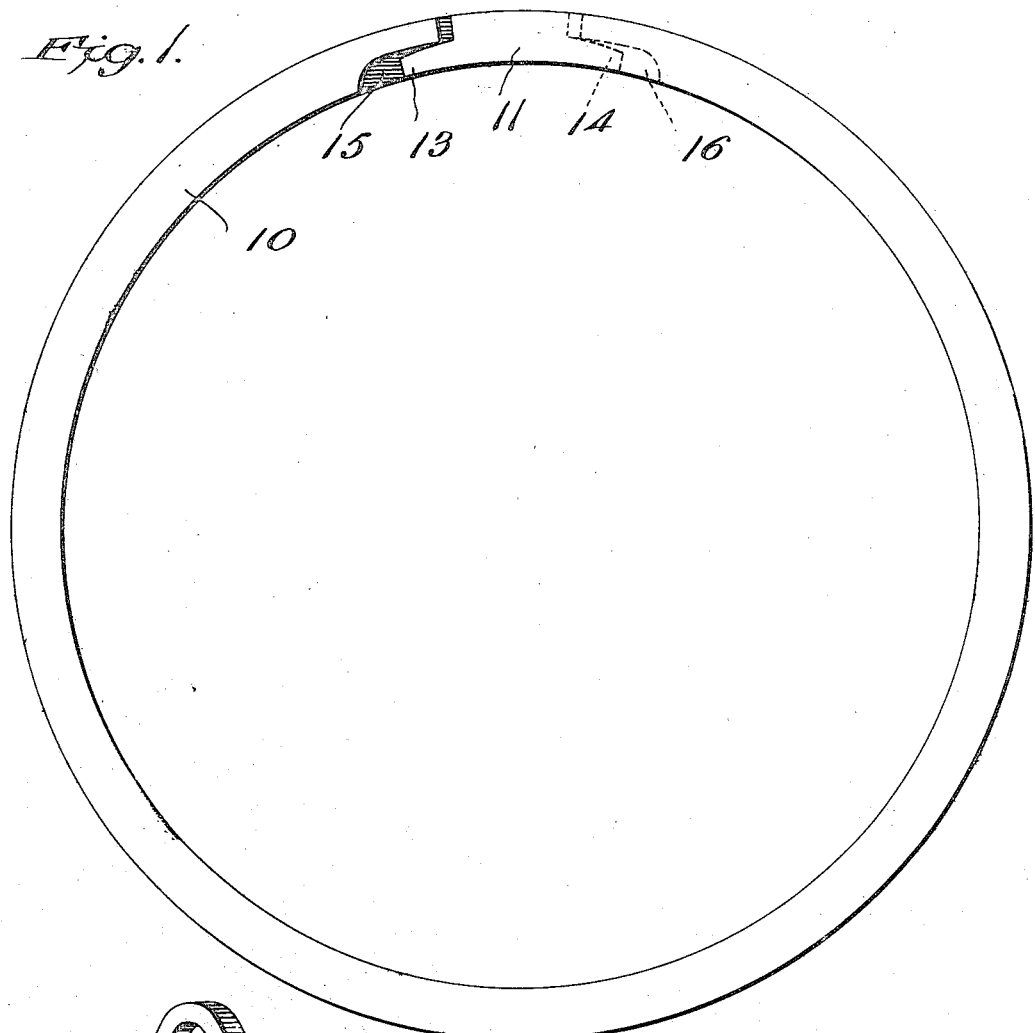

E. R. GILL.
ELASTIC PACKING RING.
APPLICATION FILED JULY 26, 1915.

1,210,371. Patented Dec. 26, 1916.

Inventor
Edwin R. Gill
By his Attorneys
Wilkinson, Giusta and MacKay

UNITED STATES PATENT OFFICE.

EDWIN R. GILL, OF YONKERS, NEW YORK.

ELASTIC PACKING-RING.

1,210,371.   Specification of Letters Patent.   Patented Dec. 26, 1916.

Application filed July 26, 1915. Serial No. 41,871.

*To all whom it may concern:*

Be it known that I, EDWIN R. GILL, a citizen of the United States, residing at Yonkers, in the county of Westchester and State of New York, have invented certain new and useful Improvements in Elastic Packing-Rings; and I do hereby declare the following to be a full, clear, and exact description of the invention, such as will enable others skilled in the art to which it appertains to make and use the same.

Packing rings for air compressors, steam engines, high pressure pumps, gas engines, etc., have been made hitherto of more or less resilient metal adapted to be sprung over a piston and into grooves surrounding the piston adapted to accommodate such rings. These rings are counted upon to produce a fluid-tight fit at all times, by reason of their pressing outward so as to hug the inner surface of the cylinder in which the piston moves; and theoretically this tight fit is preserved by the actual expansion of the rings to compensate for wear within the cylinder. In practice, however, the expansion of such rings as have been commercially used is accompanied by an opening of the joint, where the ends of the ring come together, which permits the fluid under pressure to find its way past the ring; either over its outer face, under it and through its containing groove, or by both of these paths. Various plans have been proposed for overcoming this difficulty by making the ring in two or more pieces; but I have found in practice that such devices are not only expensive as compared with one-piece rings, but fail of complete success where subjected to high pressures.

My present invention relates to an improved one-piece ring which I have found to be highly successful in practice in preventing all leakage past the ring under conditions of wear. This ring lends itself to a particularly favorable process of manufacture which is also a feature of my invention, and has been claimed in my U. S. Patent No. 1188370, dated June 20th, 1916.

My improved ring is particularly advantageous in its application to internal combustion engines wherein it is necessary to produce sudden high compression, and then successfully to confine a body of the very hot gases produced by explosion under excessively high pressures. In these engines, too, the proper lubrication of the interior of the cylinder is highly important, while at the same time it is highly desirable for many well known reasons to avoid any excess of lubricating oil being exposed to the interior burning gases. I have found that my improved ring fully meets these requirements of internal combustion engines even when applied to old machines whose cylinders have been deformed by use. Furthermore I have found that fewer rings are required on a given piston when my improved joint is used. This fact conduces to cheapness and to lightness of construction; the latter advantage being important more particularly in engines for aeroplanes and the like.

The preferred perfected form of my ring is illustrated in the accompanying drawings, wherein—

Figure 2:
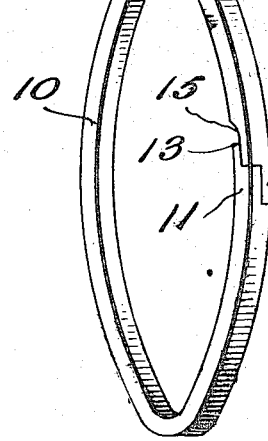
Figure 3:
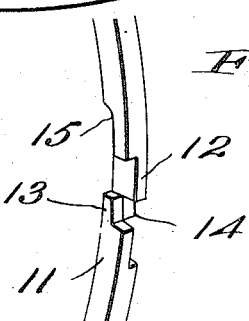

Figure 1 is a plan or face view of the ring partly open. Fig. 2 is a perspective view of the completely closed ring and Fig. 3 is a similar view of the finished joint in open position.

Some manufacturers of packing rings adopt a form wherein the inner and outer cylindrical limiting surfaces are mutually eccentric, in the belief that this arrangement is favorable to uniform pressure upon the confining walls of the cylinder within which the piston moves. Others deem this a fallacy, and use rings of uniform radial thickness. Some of these latter resort to systems such as a graduated "peening" or the like for producing a supposed uniformity of outward pressure. My improved joint may be used with rings of any of these classes, and I have shown it as employed on a ring having a substantially uniform cross section.

The process of manufacturing my ring and the advantages of the ring in its adaptation to said process are described in my aforesaid Patent Number 1188370. The ring as completed by said process is claimed herein and has the following characteristics: The ring 10 has a joint formed by laterally overlapping cheek pieces 11 and 12, each having an underhung projection, 13, 14. Behind and at one side of each cheek piece there is provided a suitable recess, 15, 16, preferably closed at its base by a short inward circular arc, and the underhung projections are shaped to enter said recesses when the ring is partly or wholly closed, as shown in Figs. 1 and 2. The underhung projections have upper surfaces which taper or have an inward departure from the normal circular form. This is best shown somewhat exaggerated for the sake of clearness in Fig. 1, and the best mode of producing the taper in question is fully set forth in my said Patent No. 1188370.

Considered both from the point of view of the above process and from that of successfully preserving a tight joint against fluid under high pressure, the tapering of the underhung projections is of vital importance.

I have found, after many experiments, that rings of the general character described herein cannot be successfully made and used, save to a very limited extent, where the upper surfaces of these underhung projections are formed in the natural and more obvious way; that is to say, are struck upon the arc of a circle concentric with the ring. Under usual conditions, when these parts are so made, they are very apt to break off, either when the blank is compressed into the position shown in Fig. 2, or after a short period of use. I have found that this difficulty can be avoided by slightly tapering the upper surfaces of these underhung projections, and that the best results as to perfect fit are obtainable by curving these surfaces in accordance with the following theory: When a ring begins to expand under conditions of wear, the outer portions of the ring are continually supported, guided and formed by the circular contour of the working cylinder. It follows from this that the outer surfaces of the ring, as it expands, conform substantially to a continually expanding circle. In other words, the circular form is constantly maintained by the control of the confining cylinder walls, while the diameter of the circle slowly increases. The underhung projections, however, act as cantilevers and remain—or tend to remain—in their original form, while they slowly change their direction with relation to the tops of the recesses 15 and 16. It is this condition or tendency which seems to be responsible for the frequent breakage of these projections when their upper surfaces are struck on a circle. It is obvious that by the tapering of these surfaces is meant a suitable inward departure from the normal circle drawn through the point where the upper surface of each underhung projection springs from the body of the ring. This departure may conform to a curve or may in some cases be substantially a straight line.

The best curvature to be given to the fitting surfaces is determined in each case by the theory and practice which is set forth in my said Patent No. 1188370. I do not limit myself to a structure wherein absolute theoretical perfection of curve is found, as this is not essential to a considerable degree of success.

It will be seen that my improved joint prevents passage of fluids under pressure across the plane of the ring by reason of the constantly overlapping cheek pieces making close sliding contact on their meeting faces. At the same time penetration of the fluid under the ring is constantly opposed by the contact between each underhung projection and the top of the corresponding recesses 15 and 16.

What I claim is—

1. An elastic packing ring having a joint formed by two meeting ends having cheek pieces adapted to overlap side by side and fitted together with sliding contact, each meeting end of said ring having a suitably formed recess behind and opposite its own cheek piece and opposite the cheek piece on the other meeting end, and each cheek piece having a slightly tapering underhung projection formed by an extension of its inner portion and adapted to slide within its opposite recess while preserving a close fit with the top of said recess.

2. An elastic packing ring having a joint formed by two meeting ends having cheek pieces adapted to overlap side by side and to fit together with sliding contact, said cheek pieces each having behind and at one side of it a suitable recess and each having an underhung projection formed by an extension of its lower part whose upper surface slopes slightly toward the center of the ring to adapt it to preserve a proper fit with the top of its opposed recess.

3. An elastic packing ring having a joint formed by two meeting ends having cheek pieces adapted to overlap side by side and fit together with sliding contact, said cheek pieces having substantially one half the thickness of the ring and each remaining half thickness presenting a recess behind and at one side of the corresponding cheek pieces closed at its base by a short inward circular arc, and slightly tapering underhung projections formed by extensions of the inner portions of said cheek pieces, adapted to preserve a sliding fit with said recesses respectively, substantially as described.

4. An elastic packing ring having a joint formed by overlapping cheek pieces having underhung projections whose upper surfaces are formed to depart inward from the normal circular form, said ring having suitably formed recesses adapted to receive said projections and to form a tight fit therewith when the joint is closed by compression of said ring.

In testimony whereof I affix my signature.

EDWIN R. GILL.